(12) United States Patent
Panwar et al.

(10) Patent No.: US 6,240,502 B1
(45) Date of Patent: *May 29, 2001

(54) APPARATUS FOR DYNAMICALLY RECONFIGURING A PROCESSOR

(75) Inventors: Ramesh Panwar, Santa Clara; Ricky C. Hetherington, Pleasanton, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/881,145

(22) Filed: Jun. 25, 1997

(51) Int. Cl.$^7$ .................................................. G06F 9/38
(52) U.S. Cl. ............................................................... 712/15
(58) Field of Search ............................. 712/23, 206, 216, 712/233, 15

(56) References Cited

U.S. PATENT DOCUMENTS 5,546,593 * 8/1996 Kimura et al. ...................... 395/800
5,694,553 * 12/1997 Abramson et al. .................. 395/250
5,699,537 * 12/1997 Sharangpani et al. ............... 395/393
5,867,725   2/1999 Fung et al. ............................. 712/23

* cited by examiner

Primary Examiner—David Y. Eng
(74) Attorney, Agent, or Firm—Philip J. McKay; Gunnison, McKay & Hodgson, L.L.P.

(57) ABSTRACT

A method and apparatus for dynamically reconfiguring a processor involves placing the processor in a first configuration having a first number (m) of strands while the coded instructions comprise instructions from a number (m) threads. The instructions in each of the m threads are executed on one of the m strands using execution resources at least some of which are shared among the m strands. While the coded instructions comprise instructions from a number (n) threads, the processor is placed in a second configuration having a second number (n) of strands. The instruction are executed in each of the n strands using execution resources at least some of which are shared among the n strands.

8 Claims, 9 Drawing Sheets

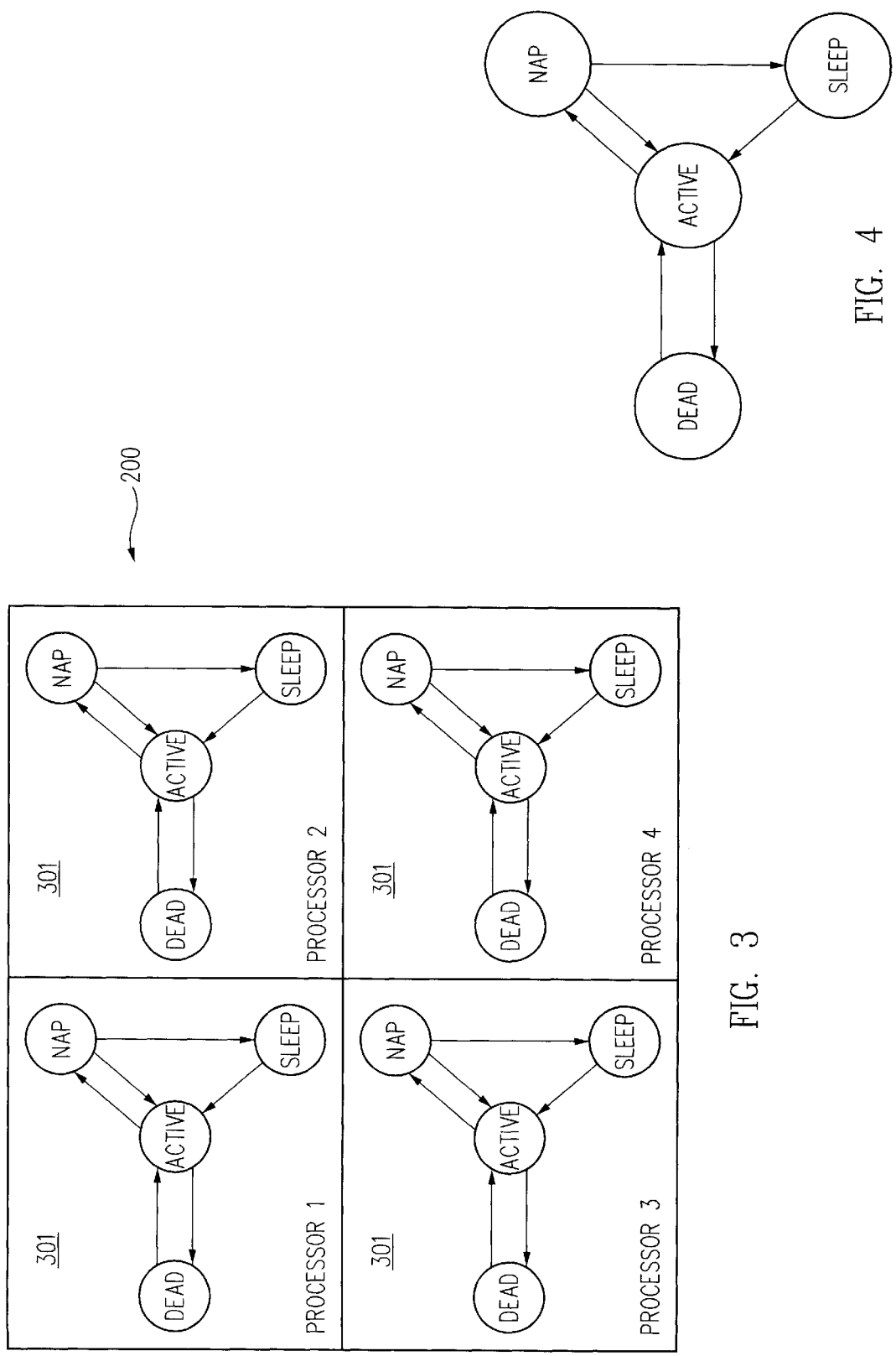

| BT ADDRESS_1 | BNT ADDRESS_1 | BHT INDEX_1 | BHR VALUE_1 | BHT VALUE_1 |
|---|---|---|---|---|
| BT ADDRESS_2 | BNT ADDRESS_2 | BHT INDEX_2 | BHR VALUE_2 | BHT VALUE_2 |
| BT ADDRESS_3 | BNT ADDRESS_3 | BHT INDEX_3 | BHR VALUE_3 | BHT VALUE_3 |
| BT ADDRESS_4 | BNT ADDRESS_4 | BHT INDEX_4 | BHR VALUE_4 | BHT VALUE_4 |
| BT ADDRESS_5 | BNT ADDRESS_5 | BHT INDEX_5 | BHR VALUE_5 | BHT VALUE_5 |
| ... | ... | ... | ... | ... |
| BT ADDRESS_N | BNT ADDRESS_N | BHT INDEX_N | BHR VALUE_N | BHT VALUE_N |

BRANCH REPAIR TABLE (BRT)

FIG. 6

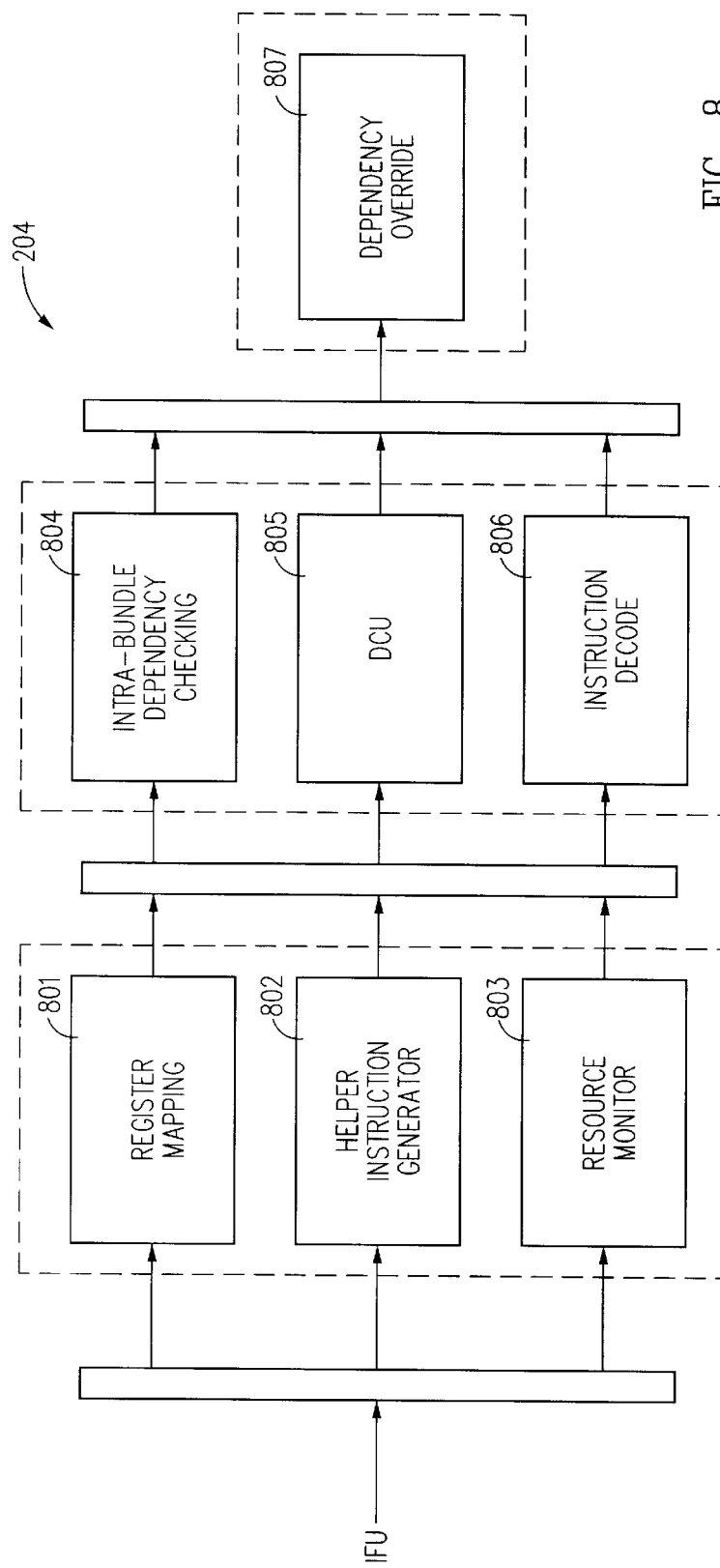

| IWB POINTER | THREAD ID | PIDs | METADATA <ID, RDY, LATENCY> | STATUS |

FIG. 9

| OP CODE | RS1 | RS2 | RD | CC |

FIG. 10

APPARATUS FOR DYNAMICALLY RECONFIGURING A PROCESSOR

CROSS-REFERENCES TO RELATED APPLICATIONS

The subject matter of the present application is related to that of co-pending U.S. Pat. application Ser. No. 08/881,958 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908, now U.S. Pat. No. 6,098,165 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173, U.S. Pat. No. 5,898,853 for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,723 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 for APPARATUS FOR TRACKING PIPELINE RESOURCES IN A SUPERSCALAR PROCESSOR filed concurrently herewith by Ramesh Panwar; Ser. No. 08/882,525 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 for AN APPARATUS FOR HANDLING REGISTER WINDOWS IN AN OUTOF-ORDER PROCESSOR filed concurrently herewith by Ramesh Panwar and Dani Y. Dakhil; Ser. No. 08/881,847 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 for NON-BLOCKING HIERARCHICAL CACHE THROTTLE filed concurrently herewith by Ricky C. Hetherington and Thomas M. Wicki; Ser. No. 08/881,727 for NONTHRASHABLE NON-BLOCKING HIERARCHICAL CACHE filed concurrently herewith by Ricky C. Hetherington, Sharad Mehrotra and Ramesh Panwar; Ser. No. 08/881,065 for INLINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

The present invention relates in general to microprocessors and, more particularly, to a system, method, and processor architecture for dynamically reconfiguring a processor between uniprocessor and selected multiprocessor configurations.

2. Relevant Background

Early computer processors (also called microprocessors) included a central processing unit or instruction execution unit that executed only one instruction at a time. As used herein the term processor includes complete instruction set computers (CISC), reduced instruction set computers (RISC) and hybrids. The processor executes programs having instructions stored in main memory by fetching their instruction, decoding them, and executing them one after the other. In response to the need for improved performance several techniques have been used to extend the capabilities of these early processors including pipelining, superpipelining, superscaling, speculative instruction execution, and out-of-order instruction execution.

Pipelined architectures break the execution of instructions into a number of stages where each stage corresponds to one step in the execution of the instruction. Pipelined designs increase the rate at which instructions can be executed by allowing a new instruction to begin execution before a previous instruction is finished executing. Pipelined architectures have been extended to "superpipelined" or "extended pipeline" architectures where each execution pipeline is broken down into even smaller stages (i.e., microinstruction granularity is increased). Superpipelining increases the number of instructions that can be executed in the pipeline at any given time. "Superscalar" processors generally refer to a class of microprocessor architectures that include multiple pipelines that process instructions in parallel. Superscalar processors typically execute more than one instruction per clock cycle, on average. Superscalar processors allow parallel instruction execution in two or more instruction execution pipelines. The number of instructions that may be processed is increased due to parallel execution. Each of the execution pipelines may have differing number of stages. Some of the pipelines may be optimized for specialized functions such as integer operations or floating point operations, and in some cases execution pipelines are optimized for processing graphic, multimedia, or complex math instructions.

The goal of superscalar and superpipeline processors, is to execute multiple instructions per cycle (IPC). Instruction-level parallelism (ILP) available in programs written to operate on the processor can be exploited to realize this goal. However, many programs are not coded in a manner that can take full advantage of deep, wide instruction execution pipelines in modern processors. Many factors such as low cache hit rate, instruction interdependency, frequent access to slow peripherals, branch mispredictions and the like cause the resources of a superscalar processor to be used inefficiently.

Superscalar architectures require that instructions be dispatched for execution at a sufficient rate. Conditional branching instructions create a problem for instruction fetching because the instruction fetch unit (IFU) cannot know with certainty which instructions to fetch until the conditional branch instruction is resolved. Also, when a branch is detected, the target address of the instructions following the branch must be predicted to supply those instructions for execution.

Recent processor architectures use a branch prediction unit to predict the outcome of branch instructions allowing the fetch unit to fetch subsequent instructions according to the predicted outcome. These instructions are "speculatively executed" to allow the processor to make forward progress during the time the branch instruction is resolved.

Another solution to increased processing power is provided by multiprocessing. Multiprocessing is a hardware and operating system feature that allows multiple processors to work together to share workload within a computing system. In a shared memory multiprocessing system, all processors have access to the same physical memory. One limitation of multiprocessing is that programs that have not been optimized to run as multiple process may not realize significant performance gain from multiple processors. However, improved performance is achieved where the operating system is able to run multiple programs concurrently, each running on a separate processor.

Multithreaded software is a recent development that allows applications to be split into multiple independent threads such that each thread can be assigned to a separate processor and executed independently parallel as if it were a separate program. The results of these separate threads are reassembled to produce a final result. By implementing each thread on a separate processor, multiple tasks are handled in a fast, efficient manner. The use of multiple processors allows various tasks or functions to be handled by other than a single CPU so that the computer power of the overall system is enhanced. However, because conventional multiprocessors are implemented using a plurality of discrete integrated circuits, communication between the devices limits system clock frequency and the ability to share resources amongst the plurality of processors. As a result, conventional multiprocessor architectures result in duplication of resources which increases cost and complexity.

Given the wide variety and mix of software used on general purpose processors, it often occurs that some programs run most efficiently on superscalar, superpipeline uniprocessors while other programs run most efficiently in a multiprocessor environment. Moreover, the more efficient architecture may change over time depending on the mix of programs running at any given time. Because the architecture was defined by the CPU manufacturer and system board producer, end users and programmers had little or no ability to configure the architecture to most efficiently use the hardware resources to accomplish a given set of tasks.

SUMMARY OF THE INVENTION

Briefly stated, the present invention involves a system, method, and processor architecture that adapts a processor's hardware to support multiple applications running in parallel on a single integrated circuit chip. The processor in accordance with the present invention can be dynamically reconfigured to have one, or more than one virtual processor unit, also called a strand. Each strand can run an independent application. Instructions from each application are fetched in a round-robin fashion from the instruction cache and deposited in the instruction scheduling window. The instruction scheduling window picks instructions from all active processes for execution. The processor includes retirement logic to retire instructions on a process-by-process basis. The configuration change from m strands to n strands is accomplished by an instruction issued either by the operating system, or by an application.

In one aspect, the present invention is a method for dynamically reconfiguring a processor that involves placing the processor in a first configuration having a first number (m) of virtual processors while the coded instructions comprise instructions from a number (m) threads or processes. The instructions in each of the m threads are executed on one of the m strands using execution resources at least some of which are shared among the m strands. While the coded instructions comprise instructions from a number (n) threads, the processor is placed in a second configuration having a second number (n) strands. The instruction are executed in each of the n strands using execution resources at least some of which are shared among the n strands.

In another aspect, the present invention involves a processor that executes coded instructions from one or more applications. The processor includes a fetch unit operative to fetch selected bundles of instructions on a thread-by-thread basis and a marking unit operative to mark each bundle with a thread identification, wherein each thread has a unique thread identification. The processor further includes a dependency checking unit operative to determine dependency between instructions. A scheduling unit receives the marked instructions from the dependency checking unit and picks instructions for execution on a thread-by-thread basis. The processor in accordance with the present invention includes plurality of architectural register files, each file comprising a plurality of architectural registers. At least one execution unit receives picked instructions from the scheduling unit and computes instruction results from source values in the architectural registers. A retirement unit responsive to the at least one execution unit transfers the instruction results to architectural registers. A data cache unit receiving the instruction results saves the instruction results to memory.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 3 illustrates a processor create unit in accordance with the present invention;

FIG. 4 shows a portion of the processor create unit of FIG. 3 in greater detail;

FIG. 6 illustrates an example format for a branch repair table used in the fetch unit of FIG. 3;

FIG. 7 illustrates an example instruction bundle in accordance with an embodiment of the present invention;

FIG. 8 shows in block diagram form an instruction rename unit shown in FIG. 2;

FIG. 9 shows an exemplary entry in an instruction scheduling window in accordance with the present invention;

FIG. 10 shows an exemplary instruction wait buffer used in conjunction with the instruction scheduling window shown in FIG. 9;

DETAILED DESCRIPTION OF THE PREFERRED EMBODIMENTS

The present invention recognizes the wide variation in software (i.e., computer instruction code) that must be accommodated by a general purpose processor. Some code is most efficiently executed on a single high-speed processor with multiple deep pipelines. However, some applications cannot take advantage of these processor architectures. Also, older software that was written before superscalar processors were common may not be optimized to take advantage of the benefits of multiple pipeline execution. Further, many applications now use multithreading software techniques that are best implemented on a multiprocessor platform rather than a single processor platform. The method, processor, and computer system in accordance with the present invention allows the processor hardware to be dynamically configured to meet the needs of a particular software application. A single processor in accordance with the present invention may be dynamically reconfigured in to, for example, sixty four or more strands coupled as a multiprocessor.

Figure 1:
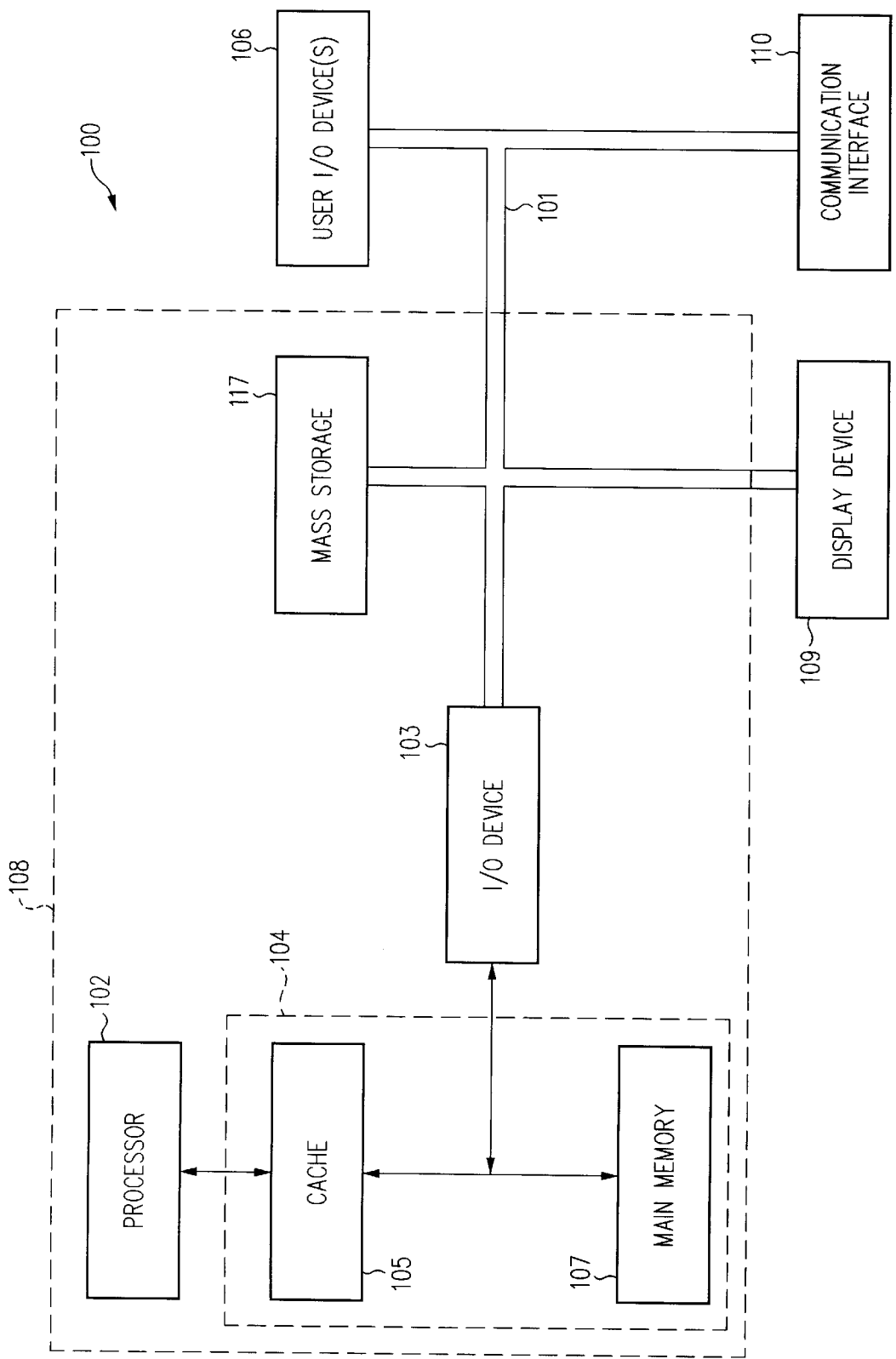
FIG. 1 shows in block diagram form a computer system incorporating an apparatus and system in accordance with the present invention.
Figure 2:
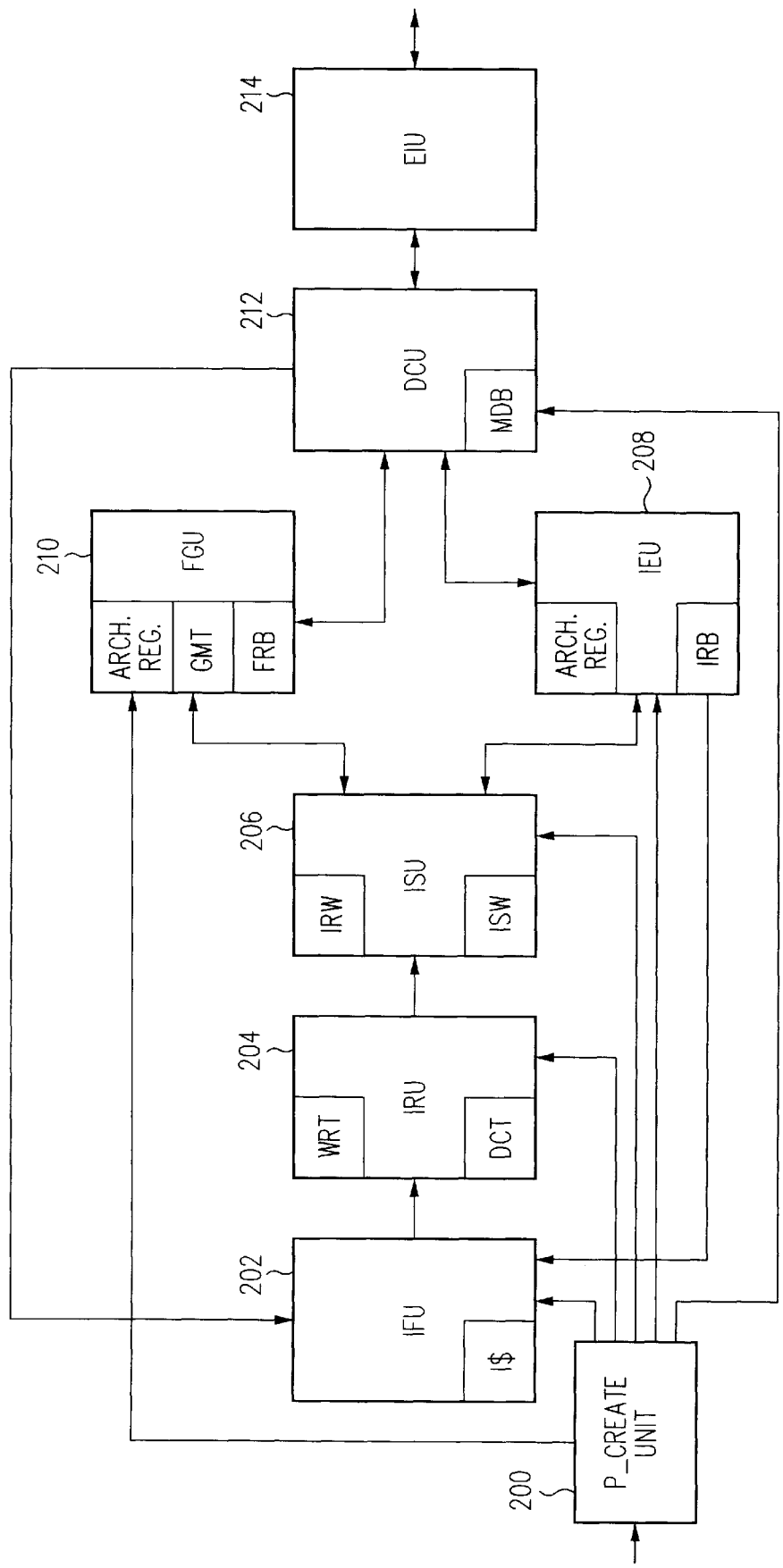
FIG. 2 shows a processor in block diagram form incorporating the apparatus and method in accordance with the present invention.

Computer systems and processor architectures can be represented as a collection of interacting functional units as shown in FIG. 1 and FIG. 2. These functional units, discussed in greater detail below, perform the functions of storing instruction code, fetching instructions and data from memory, preprocessing fetched instructions, scheduling instructions to be executed, executing the instructions, managing memory transactions, and interfacing with external circuitry and devices.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and execute multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, including another computer. Mass storage device 117 is coupled to bus 101 and is implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional units and still benefit from the apparatus and methods of the present invention unless expressly specified herein. Also, functional units are identified using a precise nomenclature for ease of description and understanding, but other nomenclature is often used by various manufacturers to identify equivalent functional units.

Unlike conventional multiprocessor architectures, the present invention may be, and desirably is, implemented as a single circuit on a single integrated circuit chip. In this manner, the individual processors are not only closely coupled, but are in essence merged such that they can share resources efficiently amongst the processors. This resource sharing simplifies many of the communication overhead problems inherent in other multiprocessor designs. For example, memory, including all levels of the cache subsystem, are easily shared among the processors and so cache coherency is not an issue. Although the resources are shared, the multiprocessor configuration in accordance with the present invention achieves the same advantages as conventional multiprocessing architectures by enabling independent threads and processes to execute independently and in parallel.

In accordance with the present invention, processor create unit 200 is coupled to receive a processor create instruction from either the computer operating system, a running application, or through a hardware control line (not shown). In a specific example, the processor create instruction is added to the SPARC V9 instruction architecture as a privileged command that can be issued only by the operating system. The processor create instruction instructs processor 102 to reconfigure as either a uniprocessor or as one of an available number of multiprocessor configurations by specifying a number of virtual processors or strands. In a specific example, one strand is created for each thread or process in the instruction code. In this manner, when it is determined by the operating system, application, or otherwise that the current instruction code can be executed more efficiently in a multiprocessor of n-processors, the processor create instruction is used to instantiate n strands to execute the code. The configuration may change dynamically in response to new applications starting or a running application spawning a new thread.

Referring to FIG. 3 and FIG. 4, processor creation unit 200 may be implemented as a plurality of state machines 301. In the example of FIG. 3, one state machine 301 is provided for each virtual processor. Any number of state machines 301, hence any number of virtual processors, may be included in processor 102. One of the state machines 301 is designated as a primary unit that is analogous to a boot processor in a conventional multiprocessor design. The primary state machine 301 will become active automatically when processor 102 is activated, while the other state machines 301 wait to respond to the processor create command to become activated.

At a minimum, each state machine comprises a "dead" or inactive state and a "live" or active state. The transition between dead and active states is controlled by the processor create command. Optionally, a processor destroy command can also be provided to move a state machine 301 from an active state to a dead state. Desirably, each state machine 301 includes a "nap" state that can be reached from the active state, and a "sleep" state that can be reached from the nap state. The active state can be reached from the dead, nap, or sleep states as shown in FIG. 4.

In a particular implementation, a virtual processor in the active state is assigned exclusive control over some of the shared resources in the functional units of processor 102. When one of the virtual processors experiences a delay in executing instructions, that delay preferably does not affect the other virtual processors. For example, when one virtual processor experiences a on-chip cache miss, it will require tens of clock cycles to obtain the required data from the off-chip cache. When an L2 cache miss occurs and data must be retrieved from main memory, or mass storage, hundreds of clock cycles may occur before that process can make forward progress.

The nap and sleep states in state machines 301 are provided to account for these delays. When a virtual processor encounters an on-chip cache miss it is placed in a nap state. The nap state disables instruction fetching only for the virtual processor in the nap state. Instruction fetching continues for the remaining virtual processors. In the nap state, instruction scheduling and execution remain enabled (described in greater detail hereinbelow). Hence, in the nap state a virtual processor is allowed to continue possession of execution resources that it has already occupied, but is not allowed to take possession of any more resources so that other virtual processors may use these resources.

When a napping virtual processor encounters a cache miss that must be satisfied by main memory, or mass storage, the virtual processor enters the sleep state. In the sleep state, all instructions belonging to the sleeping virtual processor are flushed from ISU 206. Hence, not only is the sleeping processor prevented from taking additional resources, but it is also forced to release resources previously occupied so that other virtual processors may continue execution unimpaired. The sleep state prevents instructions from the sleeping virtual processor from clogging up ISU 206 and thereby interfering with execution of instructions from other virtual processors.

Instruction fetch unit (IFU) 202 (shown in greater detail in FIG. 5) comprises instruction fetch mechanisms and includes, among other things, an instruction cache I$ for storing instructions, branch prediction logic 501, and address logic for addressing selected instructions in instruction cache I$. The instruction cache I$ is a portion of the level one (L1) cache with another portion (D$, not shown) of the L1 cache dedicated to data storage in a Harvard architecture cache. Other cache organizations are known, including unified cache structures, and may be equivalently substituted and such substitutions will result in predictable performance impact.

Figure 5:
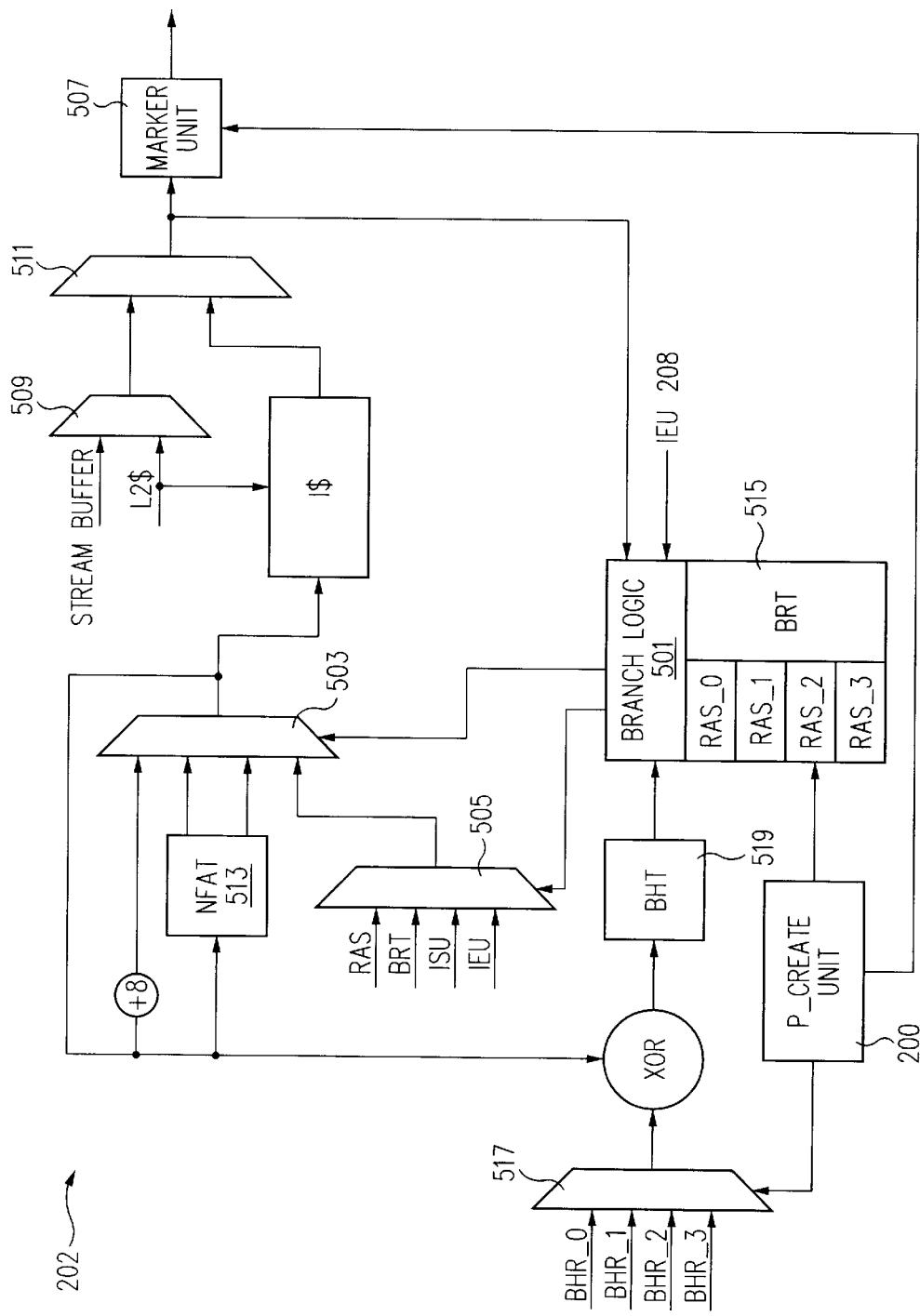
FIG. 5 shows an instruction fetch unit in accordance with the present invention in block diagram form.

IFU 202 fetches one or more instructions each clock cycle by appropriately addressing the instruction cache I$ via MUX 503 and MUX 505 under control of branch logic 501 as shown in FIG. 5. In the absence of a conditional branch instruction, IFU 202 addresses the instruction cache sequentially. Fetched instructions are passed to IRU 204 shown in FIG. 2. Any fetch bundle may include multiple control-flow (i.e., conditional or unconditional branch) instructions. Hence, IFU 202 desirably bases the next fetch address decision upon the simultaneously predicted outcomes of multiple branch instructions.

The branch prediction logic 501 (shown in FIG. 5) handles branch instructions, including unconditional branches. An outcome for each branch instruction is predicted using any of a variety of available branch prediction algorithms and mechanisms. In the example of FIG. 5, an exclusive-OR operation is performed on the current address and a value from a selected branch history register (BHR) to generate an index to the branch history table (BHT) 519. To implement a multiprocessor in accordance with the present invention, each virtual processor has a unique BHR. For a four processor implementation shown in FIG. 5, four BHR inputs labeled BHR_0, BHR_1, BHR_2, and BHR_3 are provided.

Each active BHR comprises information about the outcomes of a preselected number of most-recently executed condition and unconditional branch instructions for a particular active virtual processor. For virtual processors in the dead state, the BHR value is a don't care. An outcome can be represented in binary as taken or not taken. Each active BHR comprises an n-bit value representing the outcomes of n most-recently executed branch instructions.

Processor create unit 200 selects one active BHR using multiplexor 517. Only one BHR is selected at a time, and processor create unit 200 serves to select the BHR in a round-robin fashion each clock cycle from the virtual processors that are in an active state. Hence, if only one processor is active, only BHR_0 will be selected. Each BHR comprises the outcomes (i.e., taken or not taken) for a number of most-recently executed conditional and unconditional branch instructions occurring on a processor-by-processor basis. When a conditional branch instruction is predicted, the predicted outcome is used to speculatively update the appropriate BHR so that the outcome will be a part of the information used by the next BHT access for that virtual processor. When a branch is mispredicted, however, the appropriate BHR must be repaired by transferring the BHR VALUE from BRT 515, along actual outcome of the mispredicted branch are loaded into the BHR corresponding to the virtual processor on which the branch instruction occurred.

Next fetch address table (NFAT) 513 determines the next fetch address based upon the current fetch address received from the output of MUX 503. For example, NFAT 513 may comprise 2048 entries, each of which comprises two multi-bit values corresponding to a predicted next fetch address for instructions in two halves of the current fetch bundle. Two bits of the multi-bit values comprise set prediction for the next fetch, while the remaining bits are used to index the instruction cache I$ and provide a cache line offset in a specific implementation.

A branch repair table (BRT) 515 comprises entries or slots for a number of unresolved branch instructions. BRT 515 determines when a branch is mispredicted based upon input from IEU 208, for example. BRT 515, operating through branch logic 501, redirects IFU 202 down the correct branch path. Each entry in BRT 515 comprises multiple fields as detailed in FIG. 6. Branch taken fields (i.e., BT ADDRESS_1 through BT ADDRESS_N) store an address (i.e., program counter value) for the first fetch bundle in the branch instructions predicted path. Branch not taken fields (i.e., BNT ADDRESS_1 through BNT ADDRESS N) store an address for the first fetch bundle in a path not taken by the branch instruction. A branch history table (BHT) index (BHT INDEX_1-BHT INDEX_N) points to a location in the branch history table that was used to predict the branch instruction. The BHR VALUE and BHT VALUE fields store the value of the BHR and BHT, respectively, at the time a branch instruction was predicted.

The branch history table (BHT) 519 comprises a plurality of two-bit values. More than two-bit values may be used, but acceptable results are achieved with two bits. BHT 519 is indexed by computing an exclusive-or of the selected BHR value with the current fetch address taken from the output of MUX 503. In a specific example, the 17 least significant bits of the current address are used in the XOR computation (excluding the two most-least significant bits which are always 0's in a byte addressed processor with 32-bit instructions) to match the 17 bit values in each BHR. The XOR computation generates a 17-bit index that selects one entry in BHT. The 17 bit index enables selection from up to $2^{17}$ or 128K locations in BHT 519. One BHT 519 may be shared among any number of virtual processors.

Once a branch is resolved, the address of the path this branch actually follows is communicated from IEU 208 and compared against the predicted path address store in the BT ADDRESS fields. If these two addresses differ, those instructions down the mispredicted path are flushed from the processor and IFU 202 redirects instruction fetch down the correct path identified in the BNT ADDRESS field using the BRT input to MUX 505. Once a branch is resolved, the BHT value is updated using the BHT index and BHT value stored in BRT 515. In the example of FIG. 5, each entry in BHT 519 is a two-bit saturating counter. When a predicted branch is resolved taken, the entry used to predict this outcome is incremented. When a predicted branch is resolved not taken, the entry in BHT 519 is decremented. Other branch prediction algorithms and techniques may be used in accordance with the present invention, so long as care is taken to duplicate resources on a processor-by-processor basis where those resources are used exclusively by a given processor.

Although the fields in BRT 515 may include a thread identifier field to indicate which virtual processor executed the branch instruction assigned to that slot, BRT 515 is shared among all of the virtual processors and requires little modification to support dynamically configurable uniprocessing and multiprocessing in accordance with the present invention.

Another resource in IFU 202 that must be duplicated for each virtual processor is the return address stack (RAS) labeled RAS_0 through RAS_3 in FIG. 5. Each RAS comprises a last in, first out (LIFO) stack in a particular example that stores the return addresses of a number of most-recently executed branch and link instructions. These instructions imply a subsequent RETURN instruction that will redirect processing back to a point just after the fetch address when the branch or link instruction occurred. When an instruction implying a subsequent RETURN (e.g., a CALL or JMPL instruction in the SPARC V9 architecture) is executed, the current program counter is pushed onto a selected one of RAS_0 through RAS_3. The RAS must be maintained on a processor-by-processor (i.e., thread-by-thread) basis to ensure return to the proper location.

When a subsequent RETURN instruction is executed, the program counter value on top of the RAS is popped and selected by appropriately controlling multiplexor 505 in FIG. 5. This causes IFU 202 to begin fetching at the RAS-specified address. The RETURN instruction is allocated an entry in BRT 515 and the fall-through address is stored in the BNT ADDRESS field for that entry. If this RETURN instruction is mispredicted, it is extremely unlikely that the fall-through path is the path the RETURN should follow and IFU 202 must be redirected via an address computed by IEU 208 and applied to the IEU input to multiplexor 505.

IFU 202 includes instruction marker circuitry 507 for analyzing the fetched instructions to determine selected information about the instructions. Marker unit 507 is also coupled to processor create unit 200. This selected information, including the thread identification (i.e., the virtual processor identification) generated by processor create unit 200, is referred to herein as "instruction metadata". In accordance with the present invention, each fetch bundle is tagged with a thread identification for use by downstream functional units. Other metadata comprises information about, for example, instruction complexity and downstream resources that are required to execute the instruction. The term "execution resources" refers to architectural register space, rename register space, table space, decoding stage resources, and the like that must be committed within processor 102 to execute the instruction. The metadata can be generated by processor create unit 200 or dedicated combinatorial logic that outputs the metadata in response to the instruction op-code input. Alternatively, a look-up table or content addressable memory can be used to obtain the metadata. In a typical application, the instruction metadata will comprise two to eight bits of information that is associated with each instruction.

In many applications it is desirable to fetch multiple instructions at one time. For example, four, eight, or more instructions may be fetched simultaneously in a bundle. In accordance with the present invention, each instruction bundle includes the instruction metadata (e.g., THREAD ID) as shown in instruction bundle 700 shown in FIG. 7. I0–I7 represent conventional instruction fields that comprise, for example, an op-code, one or more operand or source register specifiers (typically denoted rs1, rs2, rs3, etc.) and a destination register specifier (typically denoted rd) and/or condition code specifiers. Other information, including instruction metadata, may be included in each I0–I7 field. As shown in FIG. 7, the instruction metadata for an entire bundle 700 may be grouped in a single field labeled THREAD ID in FIG. 7. Alternatively, the instruction metadata may be distributed throughout the I0–I7 instruction fields.

Although IFU 208 supporting dynamically configurable multiprocessing in accordance with the present invention has been described in terms of a specific processor capable of implementing one, two, three, or four virtual processors in a single processor unit, it should be appreciated that n-way multithreading can be achieved by modifying IFU 208 to fetch instructions from n different streams or threads on a round-robin or thread-by-thread basis each cycle. Because each fetch bundle includes instructions from only one thread, the modifications required to support dynamically configurable multithreading can be implemented with modest increase in hardware size and complexity. Essentially, any state information that needs to be tracked on a per-processor or per-thread basis must be duplicated. Other resources and information can be shared amongst the virtual processors. The BHR tracks branch outcomes within a single thread of execution so there should be one copy of the BHR for each thread. Similarly, the RAS tracks return addresses for a single thread of execution and so there should be one copy of the RAS for each thread.

The remaining functional units shown in FIG. 2 are referred to herein as "downstream" functional units although instructions and data flow bi-directionally between the remaining functional units. As described in greater detail below, some or all of the downstream functional units have resources that may be effectively shared among multiprocessors in accordance with the present invention. A significant advantage in accordance with the present invention is that the downstream functional units do not require complete duplication to enable multiprocessor functionality. Another advantage is that several functional units include resources that can be dynamically shared thereby enabling "on-the-fly" reconfiguration from a uniprocessor mode to any of a number of multiprocessor modes.

IRU 204, shown in greater detail in FIG. 8, comprises one or more pipeline stages (suggested by the dashed line boxes in FIG. 8) that include instruction renaming and dependency checking mechanisms. A feature of the present invention is that inter-bundle dependency checking is relaxed because bundles from different threads are inherently independent.

Register mapping unit 801 implements necessary logic for handling rename registers in a register window-type architecture such as the SPARC-V9 instruction architecture. A flat view of the entire register file set is required in order to perform dependency checking across a 128-entry window of instructions. So all register fields are collapsed by register mapping unit 801 into a single register address space. Register mapping unit 801 manages 160 integer registers and 64 floating point registers in a specific SPARC-V9 compliant example.

Helper instruction generator 802 handles, among other things, complex instructions which require more than two source operands. Helper instruction generator essentially explodes complex instructions into a plurality of simple instructions. Each simple instruction generated by helper instruction generator 802 must maintain the thread identification associated with the parent complex instruction. Helper instruction generator 802 requires no other modifications to support dynamically configurable multiprocessing in accordance with the present invention.

Resource monitor unit 803 tracks global resources in the various functional units of processor 102. Resource tracking is desirable to controllably stall processor 102 in the event resources are expended in a particular functional unit. No modifications of resource monitor unit 803 required to support configurable multiprocessing in accordance with the present invention. Intra-bundle dependency checking unit 804 serves to check dependencies within a bundle or group of eight incoming instructions. Dependency override unit 807 enables any reported dependencies within an incoming bundle (as determined by unit 804) to override any dependencies reported by dependency checking unit 805.

Dependency checking unit 805 comprises a dependency checking table or inverse mapping table. The dependency checking table comprises an entry or slot for each live instruction in the machine. The dependency checking mechanism, called an inverse map table (IMT) or dependency checking table (DCT) in a specific example, is used to analyze the instructions to determine if the operands (identified by the instructions' register specifiers) cannot be determined until another live instruction has completed. A particular embodiment of an IMT is described in greater detail in U.S. patent application Ser. No. 08/882,173 titled "APPARATUS FOR ENFORCING TRUE DEPENDENCIES IN AN OUT OF ORDER PROCESSOR" by Ramesh Panwar and Dani Y. Dakhil filed concurrently herewith, now U.S. Pat. No. 5,898,853 is operative to map register specifiers in the instructions to physical register locations and to perform register renaming to prevent dependencies. IRU 204 outputs renamed instructions to instruction scheduling unit (ISU) 206.

In a particular example, processor 102 supports 128 live instructions and so DCU 805 includes 128 entries or slots. Each instruction entry in DCU 805 comprises a plurality of fields. One of the fields in DCU 805 is a destination register (rd) and a condition code (CC) field. The rd and CC fields are only active when the instruction corresponding to the entry produces an rd-value or a CC-value and is the youngest producer of that value. In a particular example, rd is an 8-bit (or more) identifier or pointer to a register having a value produced by the instruction. The CC-value is a three-bit (or more) identifier of which condition codes the instruction produces in the particular example.

Each entry compares the source fields (rs1 and rs2) of all eight incoming instructions against the destination register field for that entry. If there is a match, the entry broadcasts its own address on to the corresponding bus through a simple encoder. This broadcast address is referred to as a producer ID (PID) and is used by instruction scheduling unit 206 to determine the ready status of waiting instructions. A match also takes place between the CC fields of the eight incoming instructions and the CC field of the entry.

The rd-encoder and the CC-encoder can be shared in an instruction set such as the SPARC-V9 instruction architecture in which there are no instructions that have both a CC-dependency and an RD-dependency. To enable sharing, certain instructions must have their operands rearranged. The rd and CC-fields of each entry are written when new instructions are loaded into the dependency table. For rd values, eight bits must be written into the entry along with the youngest bit which describes whether the entry is the latest producer of a particular register. For CC-values three bits must be written into the entry, along with a youngest bit for the CC field.

When a branch instruction is resolved and its predicted direction turns out to be wrong, the prefetched instructions following it (within the same thread or virtual processor) must be flushed from the scheduling window and dependency checking table. Fetching into the window must resume at the position following the mispredicted branch, as described hereinbefore with respect to IFU 202. However, instructions being flushed may have been taken over as being youngest producers of certain registers in the machine. There are two ways to handle this situation. One, resume fetching into the window but prevent scheduling of the new instructions until all of the previous instructions have retired from the window. Alternatively, rewind the youngest-producer information within the dependency table so the older instructions are reactivated as appropriate.

Each entry in the dependency checking table is tagged with a two-bit thread ID to identify the thread to which the instruction belongs. Each bundle of incoming instructions 700 can only belong to one thread. Only the entries containing instructions belonging to the incoming thread are considered. On a flush, the entries belonging to only the thread that suffered the branch mispredict are eliminated from the dependency checking table while the entries corresponding to the other threads stay resident in the dependency checking table. Hence, the flush information that is broadcast by integer execution unit 208 has to contain the thread identifier of the mispredicted branch.

IRU 204 further comprises a window repair table (WRT) operative to store status information about register window instructions used to restore the state of register windows after a branch misprediction. The WRT includes thirty-two entries or slots, each entry comprising one or more fields of information in a particular example. The number of entries in the WRT may be more or less depending on the needs of a particular application. The WRT can be shared amongst the multiprocessors in accordance with the present invention and does not require modification. The WRT would not be necessary in a processor that does not use register widows.

ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU assigns each live instruction a position or slot in an instruction retirement window (IRW). In a specific embodiment, the IRW includes one slot for every live instruction. IsU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and instructs IFU 202 to fetch from the correct branch. An instruction is retired when it has finished execution and all instructions from which it depends have completed. Upon retirement the instruction's result is written into the appropriate register file and is no longer deemed a "live instruction".

In operation, ISU 206 receives renamed instructions from IRU 204 and registers them for execution by assigning each instruction a position or slot in an instruction scheduling window (ISW). In a specific embodiment, the ISW includes one slot 900 (shown in FIG. 9) for every live instruction. Each entry 900 in the ISW is associated with an entry 1000 in an instruction wait buffer (IWB) shown in FIG. 10 by an IWB POINTER. In accordance with the present invention, each entry 900 includes a THREAD ID field holding the thread identification. Dependency information about the instruction is encoded in the PID fields of ISW entry 900. Metadata such as an instruction identification, ready status, and latency information, for example, are stored in META-DATA field of each entry 900. Status information, including instruction latency, is stored in the STATUS field ISW entry 900. Instruction picker devices (not shown) pick instructions from the ISU that are ready for execution by generating appropriate word lines for the instruction wait buffer so that the instruction will be read out or issued to the execution units.

The instruction is issued to IEU 208 or FGU 210 together with the thread identification and instruction identification so that IEU 208 or FGU 210 can respond back with the trap and completion status on an instruction-by-instruction basis. When the trap and completion status of an instruction arrives from IEU 208 or FGU 210, they are written into an instruction retirement window (IRW) shown in FIG. 2. Retirement logic examines contiguous entries in the IRW and retires them in order to ensure proper architectural state update.

In addition to retirement, one or more instructions can be removed from the execution pipelines by pipeline flushes in response to branch mispredictions, traps, and the like. In the case of a pipeline flush, the resources committed to the flushed instructions are released as in the case of retirement, but any speculative results or state changes caused by the flushed instructions are not committed to architectural registers. In accordance with the present invention, a pipeline flush affects only instructions in a single thread or virtual processor, leaving other active virtual processors unaffected.

Figure 11:
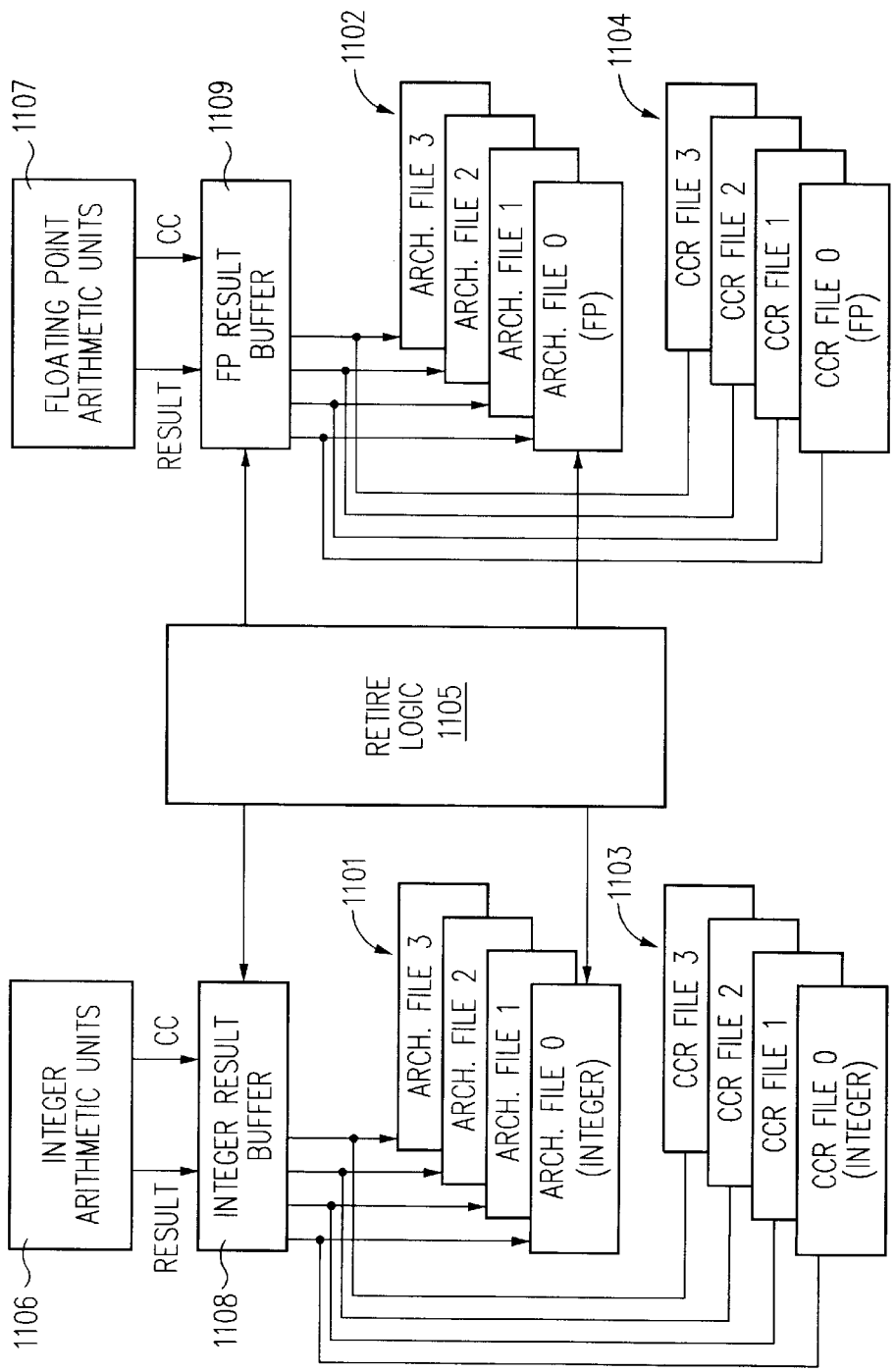
FIG. 11 shows in block diagram form instruction execution units in accordance with an embodiment of the present invention.

IEU 208 includes one or more pipelines, each pipeline comprising one or more stages that implement integer instructions such as integer arithmetic units 1106 in FIG. 11. The integer arithmetic units 1106 are shared amongst the virtual processors in accordance with the present invention. IEU 208 also includes an integer result buffer (IRB) 1108 that is shared amongst the virtual processors for holding the results and state of speculatively executed integer instructions. IRB 1108 comprises a hardware-defined number of registers that represent another type of execution resource. In a specific example IRB 1108 comprises one register slot for each live instruction.

IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of architectural integer registers in processor 102. IEU 208 preferably includes mechanisms to access single and/or double precision architectural registers 1101. In accordance with the present invention, a copy of the integer architectural register files is provided for each virtual processor as shown in FIG. 11. Similarly, a copy of the condition code architectural register files 1103 is provided for each virtual processor. Speculative results and condition codes in shared integer result buffer 1108 are transferred upon retirement to appropriate architectural files 1101 and 1103 under control of retire logic 1105. Because the architectural register files 1101 and 1103 may be much smaller than integer result buffer 1108, duplication of the architectural files on a processor-by-processor basis has limited impact on the overall size and complexity of the dynamically reconfigurable multiprocessor in accordance with the present invention.

FGU 210, includes one or more pipelines, each comprising one or more stages that implement floating point instructions such as floating point arithmetic units 1107 in FIG. 11. FGU 210 also includes a floating point results buffer (FRB) 1109 for holding the results and state of speculatively executed floating point and graphic instructions. The FRB 1109 comprises a hardware-defined number of registers that represent another type of execution resource. In the specific example FRB 1109 comprises one register slot for each live instruction. FGU 210 functions to perform final decoding of floating point instructions before they are executed on the execution units and to determine operand bypassing amongst instructions in an out-of-order processor.

In a specific example, FGU 210 includes one or more pipelines (not shown) dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used. FGU 210 preferably includes mechanisms to access single and/or double precision architectural registers 1102 and condition code registers 1104. Speculative results and condition codes in shared floating point result buffer 1109 are transferred upon retirement to appropriate architectural files 1102 and 1104 under control of retire logic 1105. Each processor is provided with a unique set of architectural registers 1102 and 1104 to provide processor independence.

Optionally, FGU 210 may include a graphics mapping table (GMT) comprising a fixed number of resources primarily or exclusively used for graphics operations. The GMT resources are typically used only for graphics instructions and so will not be committed for each live instruction. In accordance with the present invention, the instruction metadata includes information about whether the fetched instruction requires GMT-type resources. The GMT resources may be shared amongst the virtual processors in accordance with the present invention.

Figure 12:
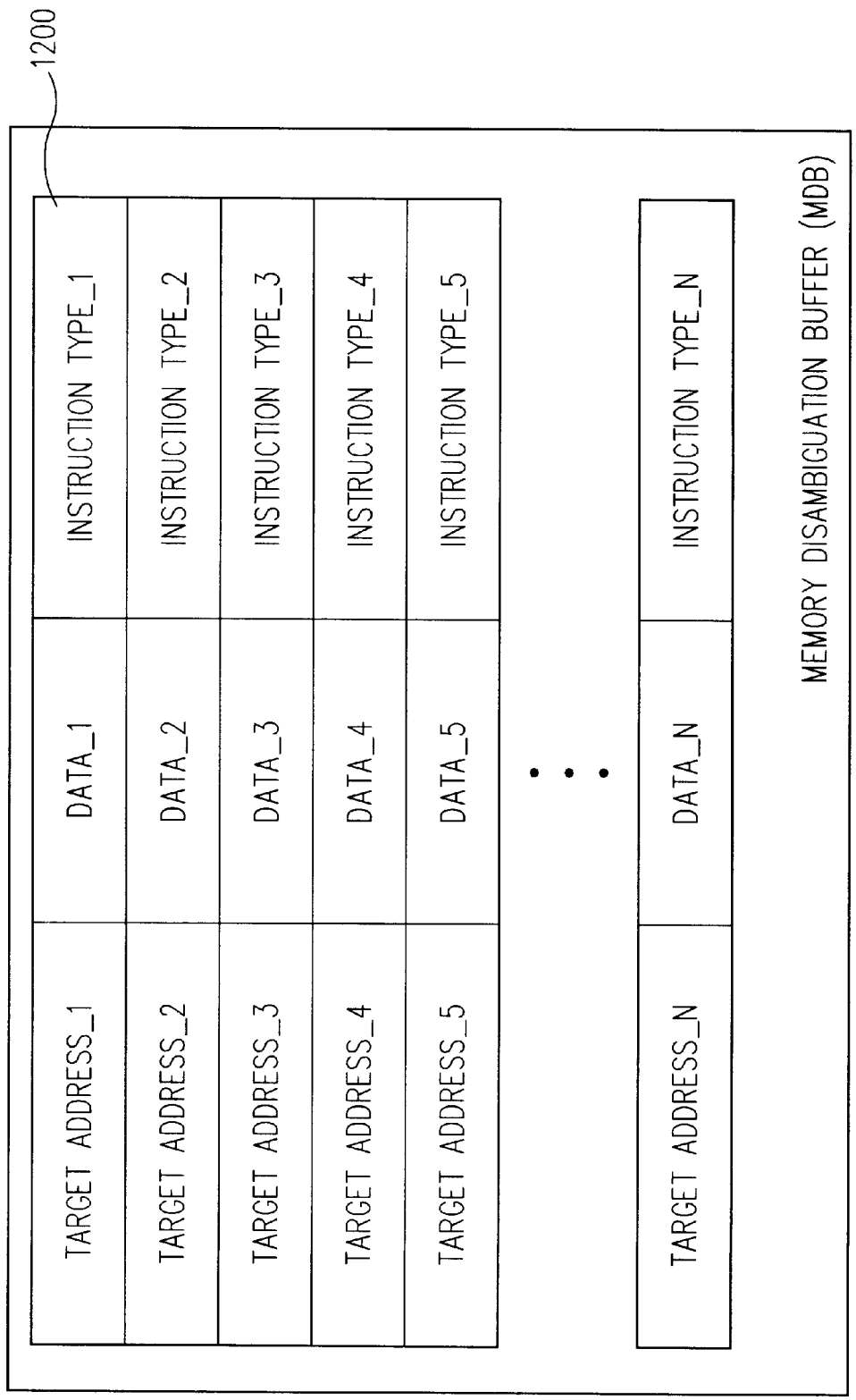
FIG. 12 illustrates an exemplary memory disambiguation buffer in accordance with the present invention.

A data cache memory unit (DCU) 212, including cache memory 105 shown in FIG. 1, functions to cache memory reads from off-chip memory through external interface unit (EIU) 214 shown in FIG. 2. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes. In a specific implementation, DCU 212 includes a memory disambiguation buffer (MDB) having a fixed number of entries 1200 shown in FIG. 12. Each MDB entry 1200 includes a number of fields. The MDB resources are primarily or exclusively used for memory operations such as load and store instructions to allow out-of-order issue and execution. In the case of memory operations, the storage location that is the target of the operation is not known until after the instruction is executed. Hence, dependency checking cannot be completely performed. Ambiguities will arise when a younger (i.e., subsequently issued) load instruction is executed before an older store instruction. The MDB essentially functions to bypass data from the older store to the younger load. Although each virtual processor in accordance with the present invention has unique architectural registers, they all share main memory. Hence, memory transactions from different active processors can interfere in much the same manner as memory transactions in a conventional out-of-order processor. Hence, no modifications are required in the MDB system to support dynamically configurable multiprocessing in accordance with the present invention. In a particular example, the MDB comprises a content addressable memory (CAM) structure having a slot assigned to each instruction corresponding to a memory operation. In accordance with the present invention, the total number of available slots is shared or divided amongst the active virtual processors. Hence, creating virtual processors does not increase the global need for MDB size.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer readable code embodied therein for dynamically configuring emulated or simulated processor. Accordingly, these and other variations are equivalent to the specific implementations and embodiments described herein.

What is claimed is:

1. A processor that executes coded instructions wherein the coded instructions comprise instructions from one or more threads, the processor comprising:

a processor create unit coupled to said processor to reconfigure the processor as a uniprocessor or in a multiprocessor configuration by specifying a number of virtual processors in response to a processor create instruction;

a fetch unit coupled to the processor create unit and operative to fetch selected bundles of instructions on a thread-by-thread basis from a memory;

a marking unit coupled to the fetch unit and operative to receive the instruction bundles from the fetch unit and mark each bundle with a thread identification, wherein each thread has a unique thread identification;

a dependency checking unit coupled to the fetch unit and operative to determine-dependency between instructions;

a scheduling unit coupled to the dependency checking unit to receive the marked instructions from the dependency checking unit and operative to pick instructions for execution on a thread-by-thread basis based on results from the dependency checking unit;

a plurality of architectural register files, each file comprising a plurality of architectural registers;

at least one execution unit receiving picked instructions from the scheduling unit and computing instruction results from source values in the architectural registers;

a retirement unit responsive to the at least one execution unit for transferring the instruction results to architectural registers; and a data cache unit receiving the instruction results and saving the instruction results to a memory.

2. The processor of claim 1 wherein the dependency checking unit further comprises:

an intra-bundle dependency checker operating independently of the thread identification; and an inter,-bundle dependency checker responsive to a thread identification to ignore apparent dependencies between instructions in different threads.

3. The processor of claim 1 wherein the dependency checking unit further comprises:

a branch history register associated with each thread, wherein each branch history register stores a value comprising outcomes of a number of most recently executed branch instructions in the associated thread.

4. The processor of claim 1 wherein the scheduling unit further comprises a register having a plurality of slots, each slot comprising a thread identification field storing the thread identification.

5. The processor of claim 1 wherein the data cache unit further comprises a memory disambiguation buffer comprising a register having a plurality of slots, each slot comprising a thread identification field.

6. A computer system comprising:

a memory;

a processor coupled to the memory, the processor further comprising:

a processor create unit coupled to said processor to reconfigure the processor as a uniprocessor or in a multiprocessor configuration by specifying a number of virtual processors in response to a processor create instruction;

a fetch unit coupled to the processor create unit and operative to fetch selected bundles of instructions on a thread-by-thread basis from a memory;

a marking unit coupled to the fetch unit and operative to receive the instruction bundles from the fetch unit and mark each bundle with a thread identification, wherein each thread has a unique thread identification;

a dependency checking unit coupled to the fetch unit and operative to determine dependency between instructions;

a scheduling unit coupled to the dependency checking unit to receive the marked instructions from the dependency checking unit and operative to pick instructions for execution on a thread-by-thread basis based on results from the dependency checking unit;

a plurality of architectural register files, each file comprising a plurality of architectural registers;

at least one execution unit receiving picked instructions from the scheduling unit and computing instruction results from source values in the architectural registers;

a retirement unit responsive to the at least one execution unit for transferring the instruction results to architectural registers; and a memory system receiving the instruction results and saving the instruction results to a memory.

7. A processor that executes coded instructions comprising:

a processor create unit coupled to said processor to reconfigure the processor as a uniprocessor or in a multiprocessor configuration by specifying a number of virtual processors in response to a processor create instruction;

an instruction fetch unit responsive to the processor create unit to fetch selected coded instructions on a virtual processor-by virtual processor basis;

an instruction execution unit coupled to receive the fetched instructions and compute instruction results; and an instruction retirement unit coupled to place the instruction results in architectural registers associated with each virtual processor.

8. The processor of claim 7 wherein the processor create unit is responsive to a processor destroy command to deactivate selected virtual processors.

* * * * *